May 20, 1924.  
R. J. McGEE  
AUTO BODY  
Filed June 26, 1923   3 Sheets-Sheet 2  
1,495,026

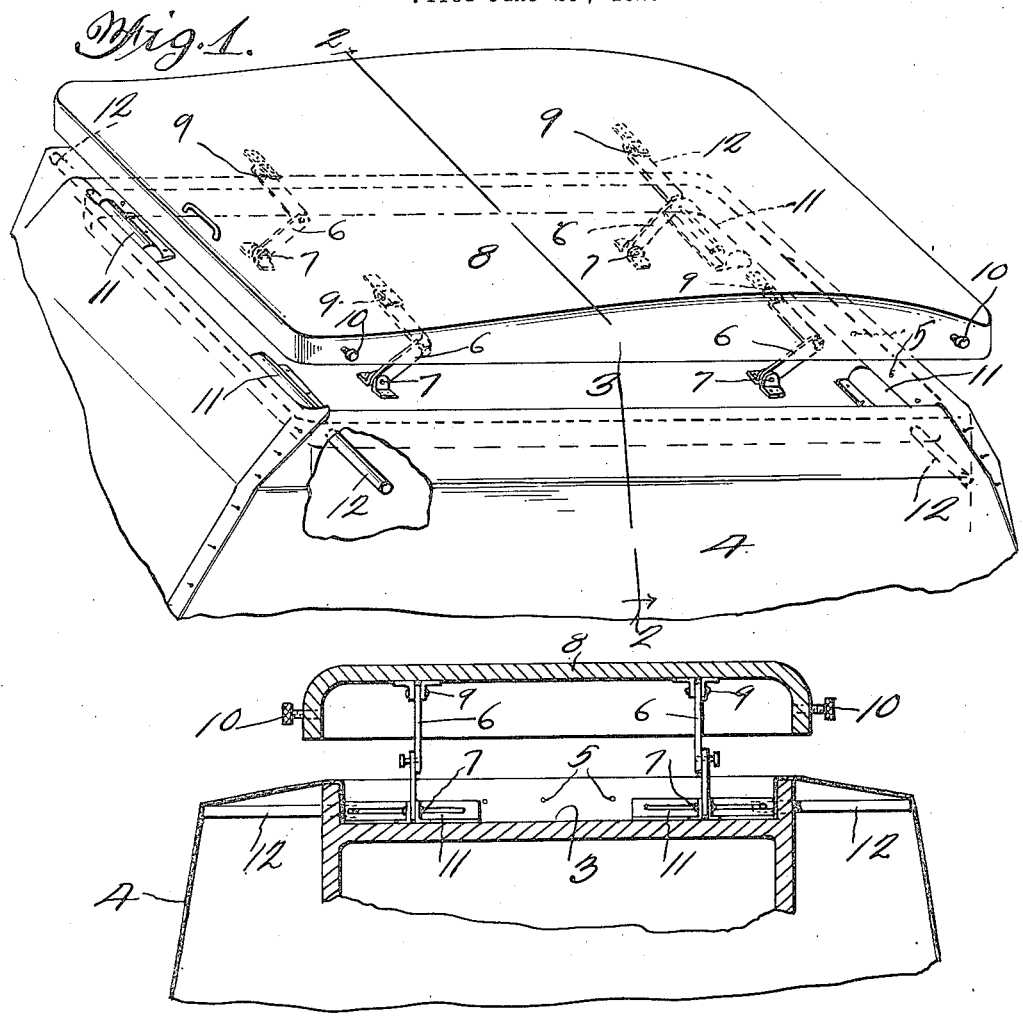

Inventor  
R. J. McGee  
By Dolwig  
Attorney

May 20, 1924.
R. J. McGEE
AUTO BODY
Filed June 26, 1923
1,495,026
3 Sheets-Sheet 3
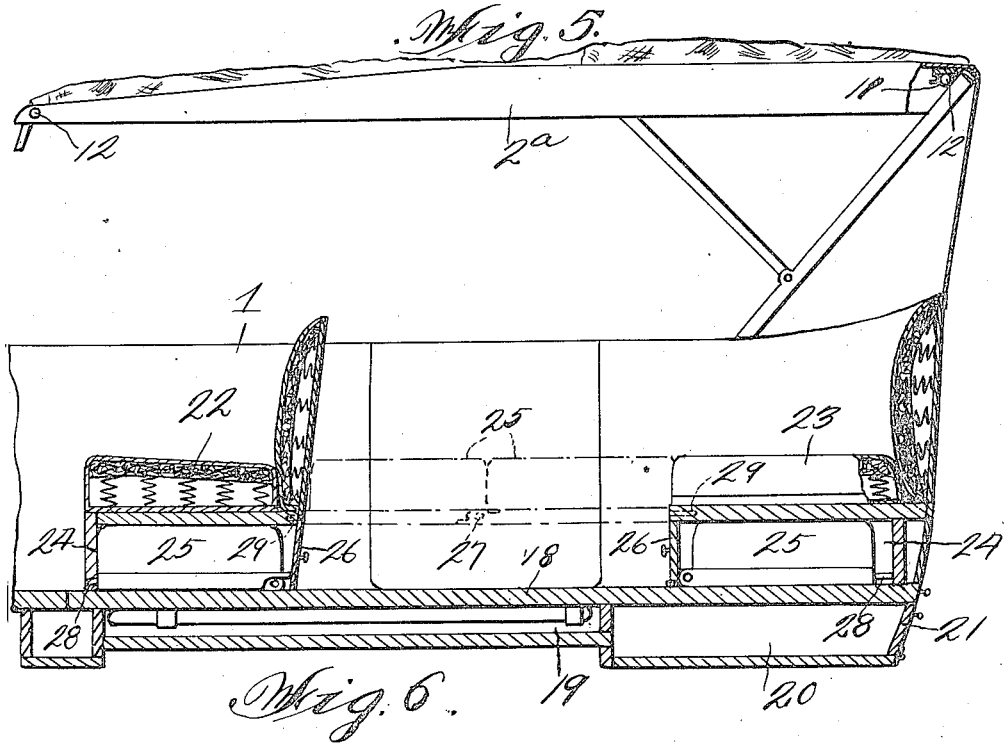
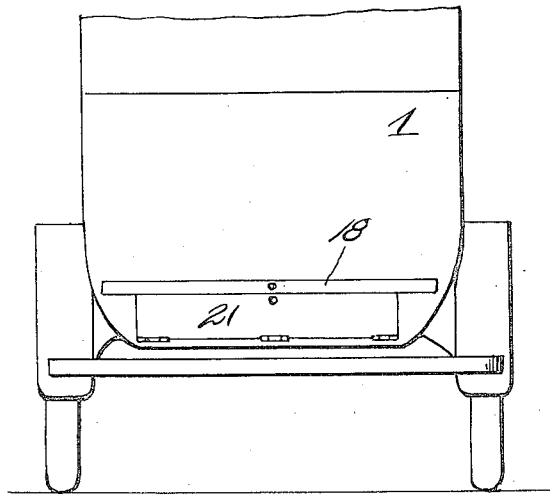
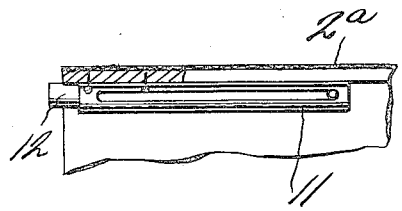
Inventor
R. J. McGee
By D. Swift
Attorney Patented May 20, 1924.

1,495,026

UNITED STATES PATENT OFFICE.

ROBERT JOSEPH McGEE, OF OWENSBORO, KENTUCKY.

AUTO BODY.

Application filed June 26, 1923. Serial No. 647,815.

*To all whom it may concern:*

Be it known that I, ROBERT J. MCGEE, a citizen of the United States, residing at Owensboro, in the county of Daviess, State of Kentucky, have invented a new and useful Auto Body; and I do hereby declare the following to be a full, clear, and exact description of the invention, such as will enable others skilled in the art to which it appertains to make and use the same.

The invention relates to automobile tents and has for its object to provide a device of this character which is carried by the automobile top and foldable thereon, said top being provided with extensible arms, which when extended form spreading means for the tent when the tent is unfolded over the automobile.

A further object is to provide an automobile tent, which tent is carried in foldable condition within a compartment of the top of the automobile, which top is provided with a raisable section, which when raised allows the tent folded within the top compartment to be moved from the compartment and spread around the automobile, and when the top is closed, the raisable section entirely houses the tent.

A further object is to provide front and rear cabinets carried by the automobile and by the running boards, in which cabinets various articles used in camping or touring may be stored. Also to provide a cabinet in the rear end of the body of the automobile for the reception of various articles, such for instance as tools, foldable chairs and foldable tables.

A further object is to provide a transversely disposed compartment beneath a removable bottom of the body of the automobile for the reception of a foldable bed. The removable bottom is slidably mounted and rearwardly removable, thereby allowing the bottom to be extended and used as a table if so desired.

A further object is to provide cushion sections which may be stored beneath the seats of the automobile and removal and utilized between the front and rear seats for forming a bed.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a perspective view of the top of an automobile, showing the raisable section thereof raised and the tent extended.

Figure 2 is a transverse sectional view taken on line 2—2 of Figure 1.

Figure 5 is a longitudinal sectional view through the automobile body, and a portion of the top broken away.

Figure 6 is a rear elevation of the automobile.

Figure 7 is a detail sectional view through a portion of the top showing one of the extensible tent holding members.

Figure 3:
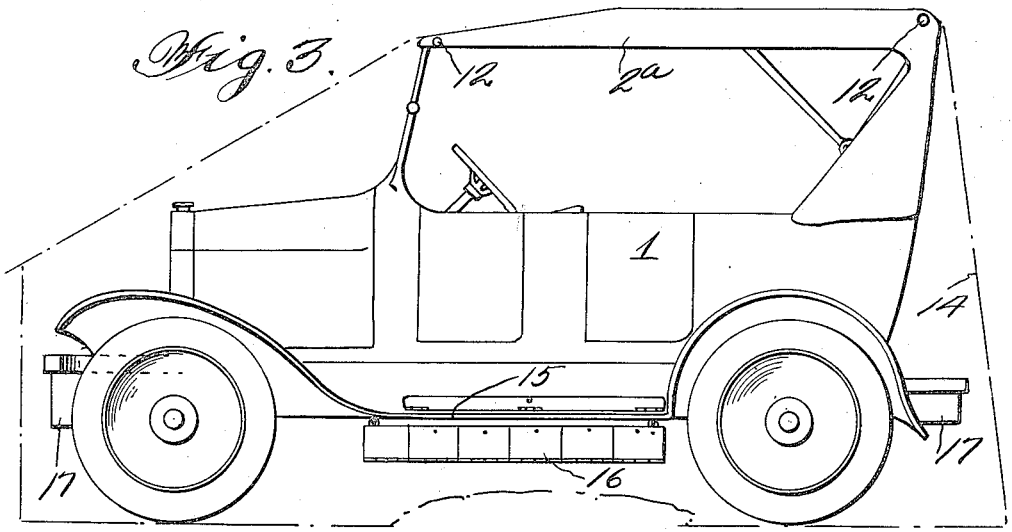
Figure 3 is a side elevation of an automobile, showing the tent applied thereto and a modified form of top onto which the tent may be folded and secured.

Referring to the drawings, the numeral 1 designates the body of an automobile and 2 the top thereof. Referring particularly to Figures 1 and 2, the top 2 is preferably of the sedan type, and is provided with a chamber 3 in its upper side, in which the upper end of the tent 4 is secured at 5, and into which chamber said tent is adapted to be folded and stored when not in use. Connected to the top 2 by means of pivotally connected links 6, which links are pivotally connected at 7 in the bottom of the chamber 3, and at 8 is a raisable top to which the upper ends of the links are pivotally connected at 9, therefore it will be seen that the top 8 when raised will straighten out the pivotally connected link 6 and allow the tent 4 to be folded into the compartment 3 and when the top 8 is lowered on top of the folded tent, the tent will be entirely concealed within the top, and consequently will not detract from the general design of the top. When the top 8 is lowered the other section of the top 2 is received within the dished portion of the top 8, and after which the top 8 may be securely held in place by means of the set screws 10.

Figure 4:
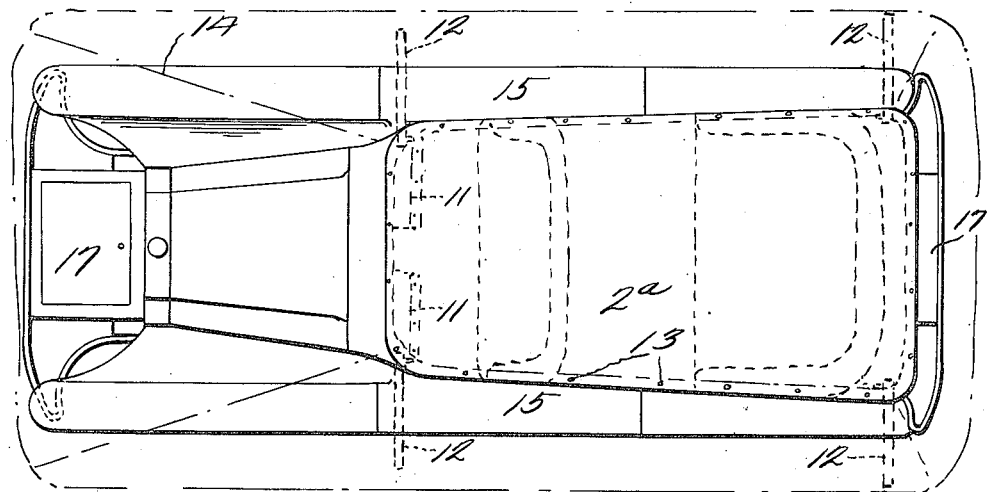
Figure 4 is a top plan view of the automobile shown in Figure 3 showing the extended tent in dotted lines.
Figure 8:
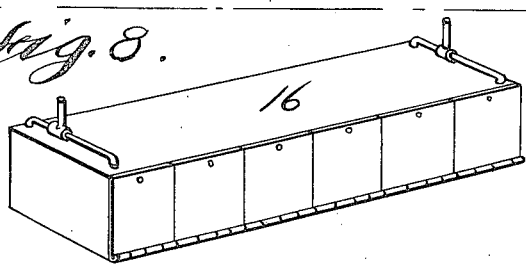
Figure 8 is a perspective view of the running board cabinet.

Disposed within the chamber 3 of the top are transversely disposed tubular members 11, in which members are slidably mounted extension arms 12, which arms when extended form spreading means for spreading the tent 4 for forming a relatively large compartment under the tent and around the automobile. When not in use the extensible members 12 are disposed inwardly in the tubular members 11. Referring to Figures 3 to 5 inclusive, the top 2ª is of a conventional form, to the upper side of which is secured by means of screws 13, a tent 14, which tent may be folded onto the top of the top 2ª and secured thereon by straps or in any suitable manner. In this form, the extension members 12 are carried in a similar manner as in the form shown in Figure 1, and the device is applied to a foldable top of a conventional form.

From the above it will be seen that a tent is provided for an automobile top, which tent may be spread by extension members and may be folded and stored within the top in such a manner that it will be entirely concealed from view, thereby obviating detraction from the general appearance of the top, and at the same time allowing a relatively large tent to be carried for touring purposes, which tent when extended will cover substantially the entire automobile and have sufficient space therein for camping or touring purposes.

Disposed on one of the running boards 15, and preferably suspended below said running board is a cabinet 16, in which cabinet provisions, cooking utensils and other articles used by tourists or campers may be stored. The front and rear ends of the automobile are provided with cabinets 17, in which cabinets camping articles may be stored or provisions, for instance ice.

The body 1 is provided with a removable bottom 18, the rear end of which extends though the rear end of the body and when pulled outwardly forms a table at the rear end of the vehicle, and at the same time allows access to a compartment 19, in which compartment a folding bed may be stored. Disposed rearwardly of the compartment 19 is a compartment 20 having a door closure 21, and in which compartment a dining table, foldable chairs or stools may be stored and if so desired bed clothing may be stored. However it is to be understood said compartments may receive other articles than those specified. Disposed beneath the front seat 22 and the rear seat 23 of the automobile in compartments 24 removable bed sections 25, which bed sections when removed through the doors may be connected together as at 27 and supported by means of pins 28 carried by said sections, which pins extend into apertures 29 in the back of the front seat 22 and the front of the rear seat 23, thereby in combination with the rear seat forming a bed which may be utilized for sleeping purposes.

It will be seen that the automobile is provided with storage space for all necessary articles used by tourists and that all of the articles are stored in such a manner that they will not be in sight and detract from the appearance of the automobile, as is now the case where bedding, tents, tables and other articles are strapped on the running board or various parts of the vehicle.

The invention having been set forth what is claimed as new and useful is:—

1. The combination with an automobile top, said top being carried by an automobile, of a tent carried by said top, an upwardly movable cover connected to said top and substantially housing the same, said tent being adapted to be folded into a compartment in the top of the automobile and entirely housed by the cover.

2. The combination with an automobile top having a tent secured within a chamber in the top thereof and adapted to be folded into said chamber, a movable cover carried by said top and having link connections therewith and forming means for entirely housing the upper side of the top and the tent in the chamber thereof, and extensible members carried by the top adapted to be extended transversely for spreading the tent when said tent is unfolded over the automobile.

3. The combination with an automobile top having a chamber in the upper side thereof, a tent secured in said chamber and foldable into the chamber, a movable cover section connected to the top and forming means for entirely housing the tent and the upper portion of the top.

In testimony whereof I have signed my name to this specification in the presence of two subscribing witnesses.

ROBERT JOSEPH McGEE.

Witnesses:
TABITHA CALHOUN,
LOCKIE E. CLARK.